United States Patent [19]

Miyauchi

[11] Patent Number: 5,144,437
[45] Date of Patent: Sep. 1, 1992

[54] PICTURE REDUCING APPARATUS TAKING AVERAGES FROM LINE MEMORIES FOR P-I-P

[75] Inventor: Mayu Miyauchi, Tokyo, Japan
[73] Assignee: NEC Corporation, Tokyo, Japan
[21] Appl. No.: 634,562
[22] Filed: Dec. 27, 1990

[30] Foreign Application Priority Data

Dec. 29, 1989 [JP] Japan .................................. 1-342891

[51] Int. Cl.⁵ .......................... H04N 7/01; H04N 5/45
[52] U.S. Cl. ...................................... 358/183; 358/140
[58] Field of Search ...................... 358/140, 183, 22

[56] References Cited

U.S. PATENT DOCUMENTS

| | | | |
|---|---|---|---|
| 4,580,163 | 4/1986 | Hartmeier | 358/140 |
| 4,984,083 | 1/1991 | Okamoto et al. | 358/22 X |
| 5,016,103 | 5/1991 | Rabii | 358/140 X |
| 5,043,811 | 8/1991 | Yasuhiro | 358/140 |

*Primary Examiner*—James J. Groody
*Assistant Examiner*—Mark R. Powell
*Attorney, Agent, or Firm*—Whittman & Marhoefer

[57] ABSTRACT

An image data processing system reproduces a small-sized picture scaled down from an original picture over a large-sized picture on a screen. A switching circuit having an input port is supplied with pieces of first video data information indicative of parts of the original picture and distributes the pieces of first video information to a plurality of output ports thereof. A plurality of line memory circuits are respectively coupled to the plurality of output ports except for one of the output ports and memorize the pieces of first video information. An averaging circuit coupled to the line memory circuits is and the aforesaid one of the output ports and averages values respectively represented by the pieces of first video data information for determining the value of a piece of second video data information indicative of a part of small-sized picture, thereby preventing the small-sized picture from loss of any part of the images incorporated in the small-sized picture.

4 Claims, 5 Drawing Sheets

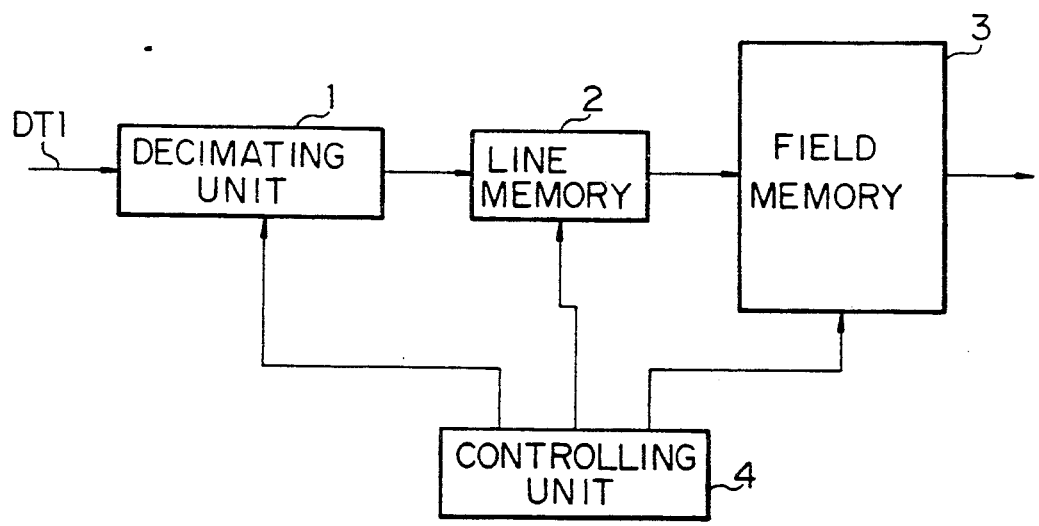
FIG. 1
PRIOR ART
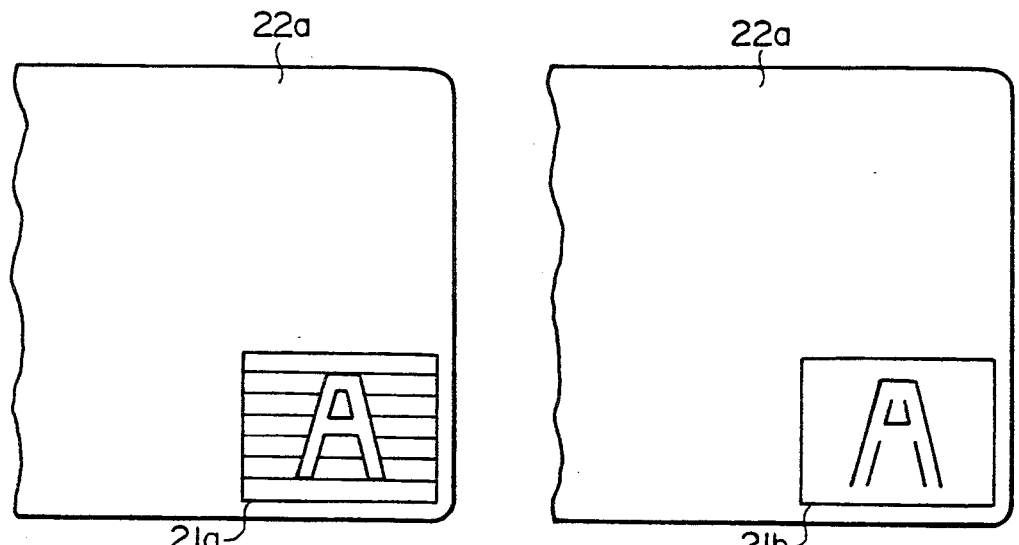
FIG. 2A
PRIOR ART
FIG. 2B
PRIOR ART

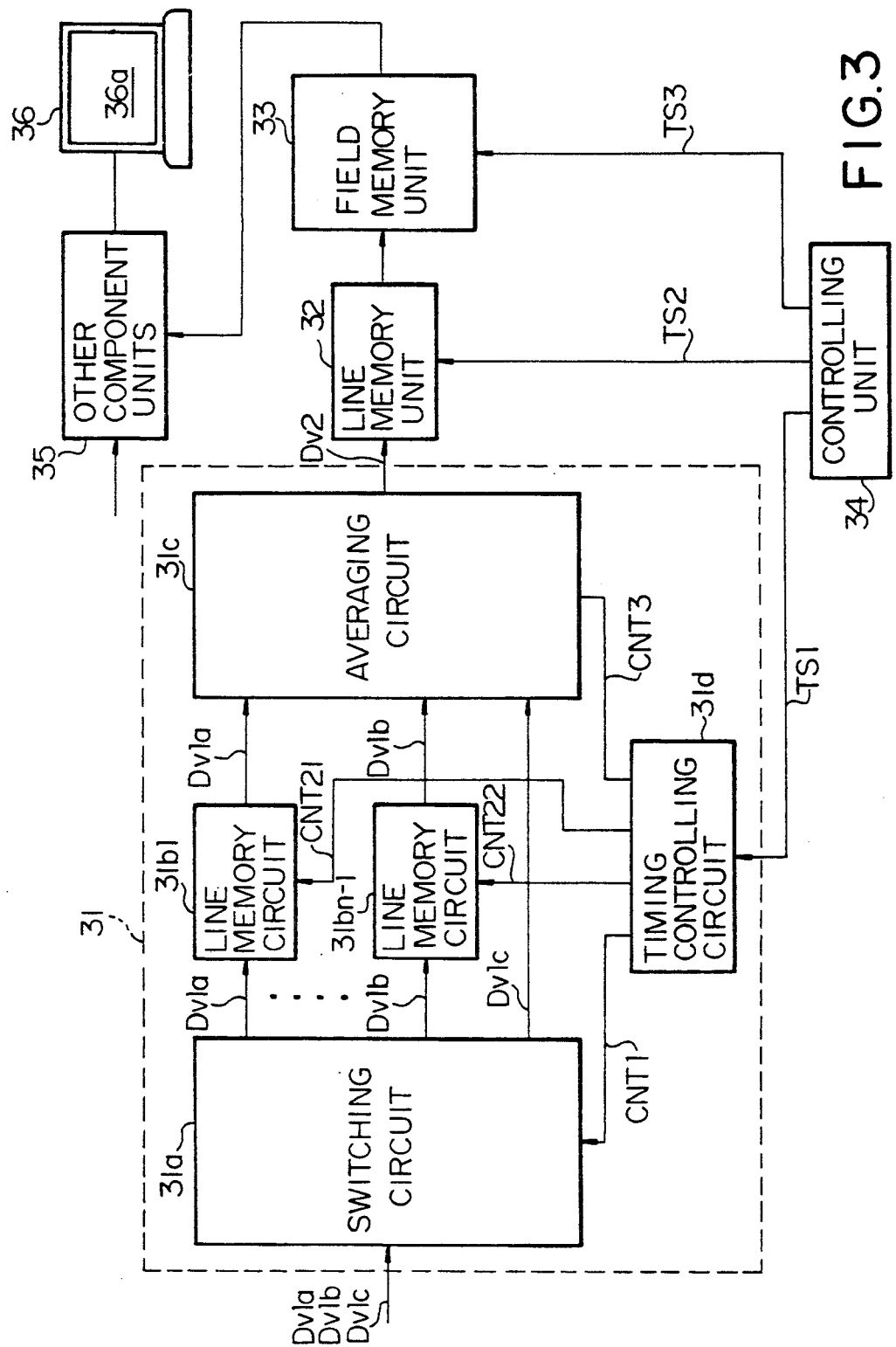

PICTURE REDUCING APPARATUS TAKING AVERAGES FROM LINE MEMORIES FOR P-I-P

FIELD OF THE INVENTION

This invention relates to an image processing system and, more particularly, to an image processing system for small-sized images scaled down from original images and reproduced over large-sized images on a screen.

DESCRIPTION OF THE RELATED ART

Progressive development of digital signal processing technology makes it possible for a home television set to display small images overlapped with large images reproduced throughout the screen. Such an attractive function for formation of multiple images is called a "Picture in Picture", and the small images and the large images are respectively referred to as "subpicture" and "main picture". In order to reproduce a subpicture on a screen, it is necessary for a television set to be equipped with a visual information storage, and the visual information storage prepares pieces of visual information of the subpicture. The visual information storage usually thins out pieces of visual information of an original picture for shrinkage, and the television set needs to sweep the screen with different synchronous timing from the main picture.

FIG. 1 shows a typical example of the visual information storage and comprises a decimating unit 1, a line memory unit 2, a field memory unit 3 and a controlling unit 4. Assuming now that the screen consists of m lines, a digital input signal DT1 carrying pieces of visual information for an original picture corresponding to the m lines is supplied to the decimating unit 1 after sampling with a sampling signal, and the decimating unit 1 thins out the digital input signal DT1, thereby allowing the pieces of visual information for every nth line to pass therethrough. The n is less than the m, and the ratio 1/n depends on the scale of the subpicture. The pieces of visual information for every nth line are temporally memorized in the line memory 2, and the pieces of visual information thus memorized in the line memory 2 are sequentially read out therefrom and written into the field memory 3 in synchronism with said sampling signal. The pieces of visual information are, then, read out from the field memory 3 with a read-out timing signal, and the read-out timing signal is n times larger than the sampling signal. The original picture is vertically scaled down through the selection of every n line and laterally shrunk with the read-out timing signal n times larger than the sampling signal, thereby preparing pieces of visual information of the subpicture.

The pieces of visual information of the subpicture is sequentially read out from the field memory 3 at different synchronous timings from those of a main picture, and the subpicture is reproduced on a small area of the screen in an overlapped manner with the main picture. Since the subpicture is given priority over the main picture, the "Picture in Picture" is achieved on the screen.

The write-in operation and the read-out operation simultaneously take place on the field memory 3, and the read-out operation is given priority over the write-in operation. However, the line memory 2 is provided in association with the field memory 3, and the line memory 2 prevents the field memory 3 from loss of any piece of visual information of the subpicture.

However, a problem is encountered in the prior art visual information storage in that lateral strips tends to be deleted from a subpicture. In detail, if an original picture has a plurality of thin lateral stripes, thin lateral stripes should be incorporated in the complete subpicture 21a reproduced over a main picture 22a as shown in FIG. 2A. However, some of the thin lateral stripes tend to be deleted from the subpicture, and incomplete picture 21b is reproduced over the main picture 22a. This is because of the fact that the decimating unit 1 thins out the digital input signal carrying the pieces of visual information of the original picture. If the pieces of visual information indicative of the thin lateral strips are discarded through the selection of every nth line, the subpicture 21b loses the thin lateral stripes.

SUMMARY OF THE INVENTION

It is therefore an important object of the present invention to provide an image processing system which reproduces a complete subpicture.

To accomplish the object, the present invention proposes to average values represented by pieces of video data information of an original picture to produce a piece of video data information of a subpicture.

In accordance with the present invention, there is provided an image processing system for reproducing a small-sized picture scaled down from an original picture, comprising: a) a scale-down unit supplied with pieces of first video data information indicative of parts of the original picture corresponding to a plurality of lines of a screen, respectively, and producing a piece of second video data information indicative of a part of the subpicture on a single line of the screen, the pieces of first video data information being sampled at respective first predetermined timings; b) a line memory unit supplied from the scale-down unit with the piece of second video data information for temporally memorizing thereinto and allowing the piece of second video data information to be read out therefrom; and c) a field memory unit supplied from the line memory unit with pieces of second video data information indicative of the small-sized picture for temporally memorizing thereinto and allowing the pieces of second video data information to be read out therefrom at respective second predetermined timings repeated at intervals shorter than those of the first predetermined timings, wherein the scale-down unit comprises a-1) a switching circuit having an input port supplied with the pieces of first video data information and distributing the pieces of first video information to a plurality of output ports thereof, respectively, a-2) a plurality of line memory circuits respectively coupled to the plurality of output ports except for one of the output ports and memorizing the pieces of first video information, respectively, and a-3) an averaging circuit coupled to the line memory circuits and the aforesaid one of the output ports and operative to average values respectively represented by the pieces of first video data information for determining the value represented by the piece of second video data information.

BRIEF DESCRIPTION OF THE DRAWINGS

The features and advantages of an image processing system according to the present invention will be more clearly understood from the following description taken in conjunction with the accompanying drawings in which:

FIG. 1 is a block diagram showing the arrangement of a visual information storage incorporated in a prior art image processing system;

FIGS. 2A and 2B are views showing incomplete and complete subpictures over a main picture;

FIG. 3 is a block diagram showing the arrangement of an essential part of an image processing unit used for preparing pieces of visual information of a subpicture;

DESCRIPTION OF THE PREFERRED EMBODIMENT

Figure 4:
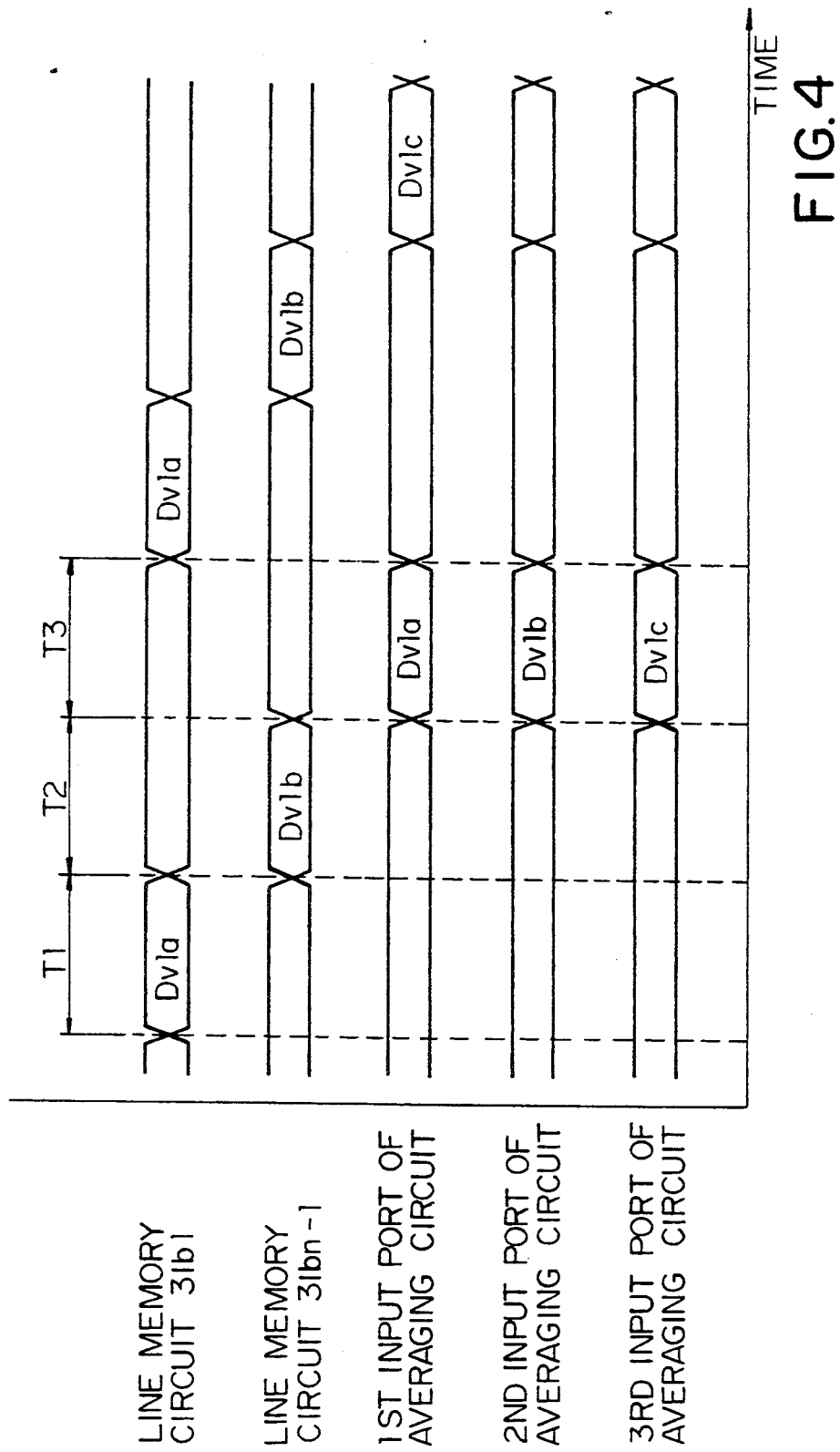
FIG. 4 is a timing chart showing the sequence of a scale-down unit incorporated in the image processing unit shown in FIG. 3.

Referring first to FIG. 3 of the drawings, an image processing system embodying the present invention comprises a scale-down unit 31, a line memory unit 32, a field memory unit 33 and a controlling unit 34. Although the image processing system shown in FIG. 3 is associated with other component units 35 for pieces of video data information of large-sized images or a main picture and a display unit 36 with a screen 36a constituted by a large number of lines sequentially swept, those units are not directly related to the gist of the present invention and, accordingly, no further description is incorporated hereinbelow. In the following description, n stands for a natural number greater than one.

The scale-down unit 31 comprises a switching circuit 31a having a single input port and n output ports, $(n-1)$ line memory circuits 31b1 to 31bn−1 coupled to the first to $(n-1)$th output ports of the switching circuit 31a, an averaging circuit 31c coupled at input ports thereof to the line memory circuits 31b1 to 31bn−1 and the nth output port of the switching circuit 31a, and a timing controlling circuit 31d for synchronism between the switching circuit 31a, the line memory circuits 31b1 to 31bn-1 and the averaging circuit 31c. The timing controlling circuit 31d is further supervised by the controlling unit 34, and the controlling unit 34 produces a first timing signal TS1 fed to the timing controlling circuit 31d and first and second write-in/read-out timing signals TS2 and TS3. The image processing system shown in FIG. 3 scales down an original picture which can be displayed on the entire screen 36a, and a scaled-down picture constituted by small-sized images serves as a subpicture overlapped with the main picture on the screen 36a. In this instance, the original picture is n times larger than the subpicture. In order to produce the subpicture, the original picture should be scaled down in not only the vertical length, i.e. the vertical direction of the screen 36a, but also the in width, i.e. the horizontal direction of the screen 36a. The width of the original picture is scaled down as similar to the prior art system shown in FIG. 1, namely, the write-in/read-out timing signal TS3 is n times higher in frequency than the sampling clock for the original picture. However, a new and useful technology is employed for vertically scaling down the original picture.

For the sake of simple description, n is assumed to be three in the following description; however, another implementation may scale down the original picture in a ratio other than three. Assuming now pieces of first video data information are indicative of parts of the original picture each displayed on one of the lines of the screen 36a, every three pieces of first video data information are grouped as Dv1a, Dv1b and Dv1c, and are supplied in series to the switching circuit 31a. In this instance, each of the pieces of first video data information Dv1a to Dv1c is coded into a six-bit digital signal.

Upon application of the first timing signal TS1 to the timing controlling circuit 31d, the timing controlling circuit 31d causes the switching circuit 31a to couple the input port thereof to the first output port thereof with a first controlling signal CNT1, and the piece of first video information Dv1a is transferred to the first output port of the switching circuit 31a. The piece of first video data information Dv1a is, then, supplied to the first line memory circuit 31b1, and is memorized in the first line memory circuit 31b1 in a time interval T1 in the presence of the second controlling signal CNT21 (see FIG. 4). When the piece of first video information Dv1a is memorized in the first line memory circuit 31b1, the timing controlling circuit 31d causes a data path to be established between the input port and the second output port of the switching circuit 31a during time interval T2, and the piece of first video data information Dv1b is memorized in the line memory circuit 31bn-1 in the presence of the third timing signal CNT22. However, while the first controlling signal CNT1 allows a time interval T3 to take place, the piece of first video data information Dv1c is directly supplied to the averaging circuit 31c, and the averaging circuit 31c is activated in the presence of a fourth timing signal CNT3 applied in the time interval T3. Since the line memory circuits 31b1 and 31bn-1 supply the pieces of first video information Dv1a and Dv1b to the averaging circuit 31c in the time interval T3, the averaging circuit 31c calculates an average of the values respectively represented by the pieces of first video information Dv1a to Dv1c, and the average is supplied to the line memory unit 32 as a second video data information. The piece of second video data information thus supplied is temporarily stored in the line memory unit 32 under the control of the controlling unit 34 and, then, transferred to the field memory unit 33. The piece of second video data information is used for reproducing a part of the subpicture on a single horizontal line and contains the three pieces of first video data information averaged by the scale-down unit 31. As a result, a part of an original picture such as, for example, a horizontal stripe is never lost from the subpicture. The averaging circuit 31c described hereinbefore carries out the arithmetic mean on the basis of the three pieces of first video data information indicative of parts of the original picture reproduced on three lines. However, if the averaging circuit 31c carries out a weighted mean, the piece of second video data information is desirable. Namely, the averaging circuit 31c calculates a weighted mean of the values respectively represented by the pieces of first video data information. In this instance, the piece of first video data information Dv1b is weighted by two with respect to each of the pieces of first video data information Dv1a and Dv1c. This results in that each piece of second video data information is constituted by a quarter of the piece of first video data information Dv1a, the half of the piece of first video data information Dv1b and a quarter of the piece of first video data information Dv1c which form the ratio 1:2:1. The weighted mean allows the display unit 36 to reproduce the sharp outline of the part of the subpicture on the screen 36a, and the averaging circuit 31c is simplified. The value represented by each piece of first video information is proportional to a shade reproduced on a line of the screen 36a, and any image is surely left in the weighted mean even though the shade is slightly different. The averaging circuit 31c produces a piece of second video data information Dv2 with value of the weighted mean, and the piece of second video data information Dv2 is indicative of a part of the subpicture reproduced on a single line of the screen 36a. The piece of second video data information is also coded into a six-bit digital signal. The piece of second video data information Dv2 is temporally memorized in the line memory unit 32 and, then, transferred to the field memory unit 33 under the control of the controlling unit 34 as similar to the prior art system shown in FIG. 1.

Figure 5:
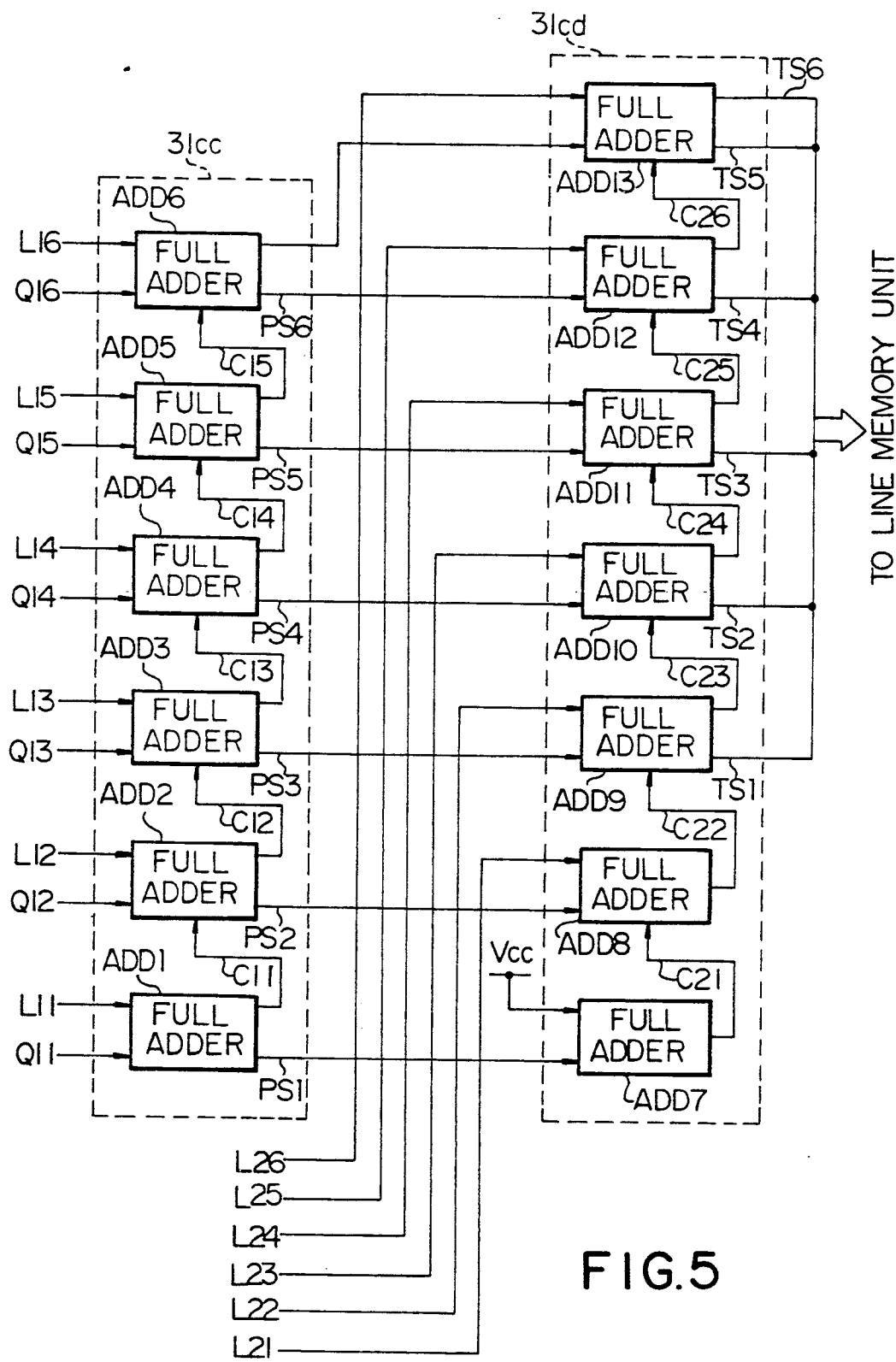
FIG. 5 is a block diagram showing the circuit arrangement of an averaging circuit incorporated in the scale-down unit shown in FIG. 4.

Turning to FIG. 5 of the drawings, the averaging circuit 31c for forming a weighted mean is implemented by an array of full adders ADD1 to ADD13, and six-bit digital signal lines (L11, L12, L13, L14, L15, L16), (L21, L22, L23, L24, L25, L26) and (Q11, Q12, Q13, Q14, Q15, Q16) respectively propagating the pieces of first video data information Dv1a, Dv1b and Dv1c. The full adders ADD1 to ADD6 form in combination a first adder array 31cc, and the digital signals on the digital signal lines L11, L12, L13, L14, L15 and L16, and Q11, Q12, Q13, Q14, Q15 and Q16 are supplied in parallel to the fist adder array 31cc. The full adders ADD1 to ADD6 respectively calculate first partial sums PS1, PS2, PS3, PS4, PS5, PS6, and carry bits C11, C12, C13, C14, C15, C16 are propagated to the adders ADD 2 to ADD6. The digital signal on the digital signal lines L21, L22, L23, L24, L25 and L26 is supplied to the full adders ADD7 to ADD13 which as a whole constitute a second adder array 31cd. The full adders ADD7 to ADD13 respectively calculate second partial sums TS1 to TS6, and carry bits C21 to C26 are propagated to the adjacent full adders ADD8 to ADD13. The total sum consisting of the second partial sums TS1 to TS6 is, then, supplied to the line memory unit 32 as the piece of second video data information Dv2. The second adder array 31cd is constituted by seven full adders ADD7 to ADD13, and the digital signal on the signal lines L21 to L26 indicative of the piece of first video data information Dv1b is directly supplied to the full adders ADD7 to ADD13, and the partial sums PS1 to PS6 are fed to the full adders ADD7 to ADD12. The digital signal indicative of the piece of first video data information Dv1b is shifted by one bit toward the most significant bit (MSB) with respect to the partial sums PS1 to PS6, and, for this reason, the value of the piece of first video data information Dv1b is doubled with respect to each of the pieces of first video data information Dv1a and Dv1c. Only the outputs TS1 to TS6 of the full adders ADD9 to ADD13 are supplied to the line memory unit 32, and the output TS1 serves as the least significant bit of the digital signal indicative of the piece of second video data information. This results in the total sum calculated by the first and second adder arrays 31cc and 31cd being divided by four, and the piece of second video data information is indicative of the weighted means. Thus, the pieces of first video data information Dv1a, Dv1b and Dv1c are weighted in the proportion 1:2:1, the values thereof are added together, and, then, the total sum is divided by four, thereby calculating the weight mean or the piece of second video data information the value of which contains a quarter of the piece of first video data information Dv1a, the half of the piece of first video data information Dv1b and a quarter of the piece of first video data information Dv1c. The multiplication and division are achieved through simple bit-shifting operations, and the circuit arrangement of the averaging circuit 31c is surely simple.

Figure 6:
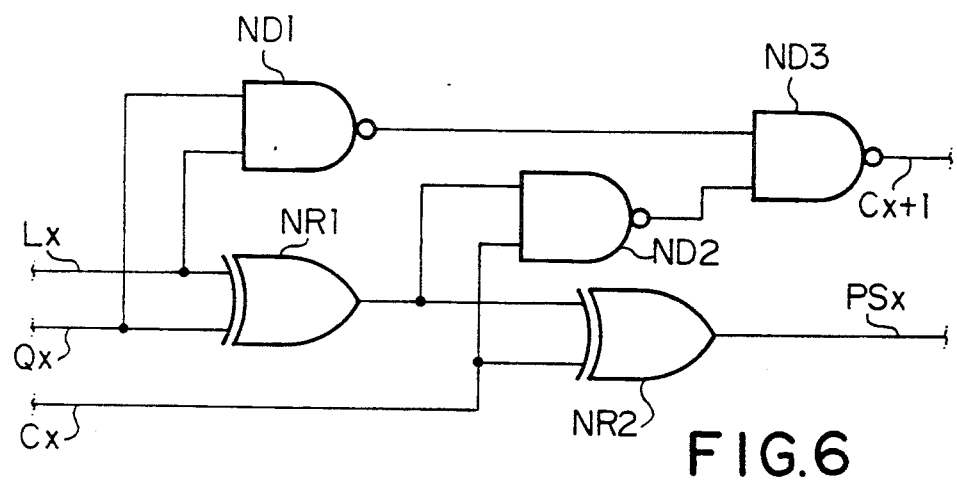
FIG. 6 is a logic diagram showing an adder incorporated in the averaging circuit shown in FIG. 5.

Turning to FIG. 6 of the drawings, each of the full adders ADD1 to ADD13 comprises three NAND gates ND1, ND2 and ND3 and two NOR gates NR1 and NR2. Two input bits Lx and Qx are supplied in parallel to the NAND gate ND1 and the NOR gate NR1, and a carry bit Cx is supplied to the NAND gate ND2 and the NOR gate NR2. The NOR gate NR2 yields a partial sum, and a carry bit Cx+1 is supplied from the NAND gate ND3.

Although particular embodiments of the present invention have been shown and described, it will be obvious to those skilled in the art that various changes and modifications may be made without departing from the spirit and scope of the present invention. For example, the pieces of first video data information DV1a to DV1c may be weighted in a proportion different from that of the above described embodiment, i.e. 1:2:1.

What is claimed is:

1. An image processing system for reproducing a small-sized picture scaled down from an original picture, comprising:

a) a scale-down unit supplied with pieces of first video data information indicative of parts of said original picture corresponding to a plurality of lines of a screen, respectively, and producing a piece of second video data information indicative of a part of said small-sized picture on a single line of aid screen, said pieces of fist video data information being sampled at respective first predetermined timings;

b) a line memory unit supplied from said scale-down unit with said piece of second video data information for temporarily memorizing thereinto and allowing said piece of second video data information to be read out therefrom; and c) a field memory unit supplied from said line memory unit with pieces of second video data information indicative of said small-sized picture for temporarily memorizing thereinto and allowing said pieces of second video data information to be read out therefrom at respective second predetermined timings repeated at intervals shorter than those of said first predetermined timings, wherein said scale-down unit comprises a-1) a switching circuit having an input port supplied with said pieces of first video data information and distributing said pieces of first video information to a plurality of output ports thereof, respectively, a-2) a plurality of line memory circuits respectively coupled to said plurality of output ports except for one of said output ports and memorizing said pieces of first video data information, respectively, and a-3) an averaging circuit coupled to said line memory circuits and said one of said output ports and operative to average values respectively represented by said pieces of first video data information so as to calculate a weighted average for determining the value represented by said piece of second video data information, one of said pieces of first video data information at the center of said plurality of output ports being weighted by a factor larger than those of the other of said pieces of first video data information.

2. An image processing system as set forth in claim 1, in which said averaging circuit comprises:
   a first array of full adders supplied with a first predetermined number of said pieces of first video data information corresponding to said first predetermined number of lines selected from said plurality of lines of said screen for producing a first sum, and
   a second array of full adders supplied with said first sum and at least one of said pieces of first video data information corresponding to at least one of the remaining lines of said screen for producing a second sum indicative of the value of said piece of second video data information.

3. An image processing system as set forth in claim 1, in which said averaging circuit calculates an arithmetic means.

4. A visual information storage for reproducing a subpicture over a main picture reproduced throughout a screen, comprising:
   an (n:1) processing circuit supplied with pieces of first video data information indicative of parts of an original picture on n lines of said screen, respectively, and operative to produce a piece of second video data information indicative of a part of said subpicture on a single line, n being a natural number greater than one;
   a line memory unit temporarily memorizing said piece of second video data information and allowing said piece of second video data information to be read out at a first predetermined timing; and
   a field memory unit memorizing pieces of said second video data information indicative of said subpicture for scale down said original picture and operative to allow each of said pieces of second video data information indicative of a part of said subpicture on a single line to be read out at a second predetermined timing different from said first predetermined timing, said (n:1) processing circuit comprising:
   a switching circuit having n output ports and distributing pieces of first video data information to said output ports, respectively,
   $n-1$ line memory circuits respectively coupled to $n-1$ output ports selected from said n output ports and temporarily memorizing $n-1$ pieces of first video data information, each of said line memory circuits storing each of said $n-1$ pieces of first video data information indicative of a part of said original image on a single line, and
   an averaging circuit supplied with said n pieces of first video data information directly from the nth output port and through said $n-1$ line memory circuits and supplying said piece of second video data information produced through an averaging operation on said n pieces of first video data information.

* * * * *